Patented Nov. 29, 1938

2,138,737

UNITED STATES PATENT OFFICE 2,138,737

EGG PRODUCT AND PROCESS OF PRODUCING SAME

Raymond D. Gerwe, Cincinnati, Ohio

No Drawing. Application June 29, 1937,
Serial No. 151,028

5 Claims. (Cl. 99—196)

This invention relates to an improved egg product and process for producing the same.

The incorporation of sodium chloride and sugar in frozen egg products to impart certain desirable emulsifying and preserving properties thereto is known, but to my knowledge the products so treated have been more or less restricted in their use and no commercially practical product of this type has heretofore been proposed embodying a salt and sugar content of such ratio as will adapt the product for use in the manufacture of a relatively wide range of edibles and still maintain the desired preserving and emulsifying qualities.

The primary object of the present invention therefore is to provide an egg product embodying added sodium chloride and sugar in such relative ratio or quantities and prepared in a manner such as will bring about improved preserving and emulsifying characteristics and which at the same time is adapted for use in the manufacture of a relatively wide range of edibles, including baked goods, mayonnaise, salad dressings, and salad dressing products such as Thousand Island dressing.

Another object of the invention is to provide a product of this type which chills rapidly, relatively speaking, when subjected to low temperatures in preparation for storage, thereby affording less time for bacteria to multiply during the time intervening until the product reaches a temperature adverse to bacterial growth, and which also thaws rapidly in preparation for use so that the bacteria cannot multiply during the thawing stage.

Briefly stated, the improved egg product forming the subject matter of the present invention consists of all the yolks of the material separated from the whites of a given number or quantity of eggs plus sufficient white to yield a mix representing approximately forty-eight per cent of the total or combined weight of the yolks and whites so separated. Sodium chloride and sugar is then incorporated in an amount such as will yield a mixture containing approximately one and one-half per cent added sodium chloride and ten per cent sugar. While cane sugar is to be preferred, it will be understood that other types of sugar may be used, such as cerelose (corn sugar).

A preferred method of preparing the product is as follows:

A certain quantity or number of eggs are broken and the yolks and whites separated and then weighed separately. Sufficient whites are then added to the yolks such that the weight of the yolks and added whites comprise approximately forty-eight per cent of the total or combined weight of the separately weighed yolks and whites. In the practice of this method, I have designed a chart which indicates for any specific combined weight of the yolks and whites obtained from any quantity of eggs the amount of whites that must be added to the yolks to obtain the specified mix, which for the purposes of description is designated herein as the "forty-eight per cent mix". The mixture is then thoroughly agitated and sufficient sodium chloride and sugar are added to yield a preparation containing one and one-half per cent added sodium chloride and ten per cent sugar. This preparation is thoroughly mixed and then weighed into cans (for example, thirty pounds to the can) and finally frozen at a temperature approximating 0° F.

In developing the product, I have found that the amount of whites which will cling to the yolks varies in accordance with the season of the year, the care used in separating the yolks from the whites, and the temperature of the eggs when broken, and since the solids content of yolks practically free from whites is about forty-nine per cent as compared with about thirteen per cent total solids in whites, different batches of separated yolks will vary considerably in total solids content. For instance, in the winter and early part of the spring the white of an egg is quite viscous and it is very difficult to separte the white completely from the yolk, with the result that the total solids content of the yolks is lowered. On the other hand, later in the spring and in the summer the whites are more fluid, and are more completely separated from the yolks, with the result that the yolks have a high solids content. If the eggs are separated at a warm temperature, a more complete separation is effected, with subsequent high solids content of the yolks, whereas if the breaking temperature is comparatively low the whites become more viscous regardless of the season, and as a result complete separation of yolks and whites cannot be effected, and the yolks have a low solids content. If carelessness is used in the separation, the yolks will contain a large amount of whites with consequent reduction in the solids content of the yolks. In addition to these factors, during storage of shelled eggs there is a gradual transfer of some of the moisture of the whites into the yolks, thereby lowering the solids content of the yolks.

In my experiments, I have found that for my purpose the solids content of yolks almost entirely free from adhering whites is practically constant; that the solids content of the whites is likewise practically constant; and that the proportion of whites and yolks contained in eggs (providing the eggs have not been stored unduly long), is practically a constant value. On the basis of these facts I have found that despite all the above described factors which are instrumental in bringing about wide variations in the total solids content of yolks, I can by my method, in a simple and very practical way, obtain a yolk containing a desired amount of white which will have for my purposes a practically constant solids content. In the preparation of salad dressing products, mayonnaise, and baked products such as cakes, in order that uniformity might be maintained in these products, it is important that the egg yolk material used be of uniform solids content.

While the product ordinarily is frozen at approximately 0° F. and held at low temperature until ready for use, it may be used without freezing and subsequent thawing. However, I find that in mayonnaise and salad dressing products, it works best if frozen and then thawed and used while still at comparatively low temperatures.

I have also found that the presence of the quantity of sugar and sodium chloride specified influences the freezing point of the mixture to such extent that the product does not freeze to a hard, solid mass as does untreated egg preparations. Moreover, the product thaws readily when removed from the freezer to a fluidity such that it may be used easily and without extra labor and loss of time in bakery preparations, mayonnaise and salad dressing products. In addition, the presence of this amount of sodium chloride and sugar materially aids in preserving the product by increasing its ability to conduct heat, thereby affording more rapid chilling, and affording less time for bacteria to multiply during the time intervening until all of the product reaches a temperature adverse to bacterial growth, and furthermore, the time necessary to thaw the material to a consistency satisfactory for use is shortened so that the bacteria cannot multiply sufficiently to bring about spoilage. These substances also tend to bring about during storage at low temperature a decrease in the bacterial count of the product.

Another feature of advantage is that the foregoing method eliminates the use of a refractometer to control the solids content of the mixture, thereby simplifying and reducing the cost of preparation of the product.

It will be understood that the foregoing specific percentages of added sodium chloride and sugar and the specific description of the method of preparation of the improved product may be varied within certain limits as defined by the appended claims. For instance, the method is applicable to obtaining a product of uniform and practically constant total solids content at any level of total solids content which I might desire. Thus, I might wish to add whites to such extent that the resulting mixture of yolks and whites might represent 48, 50, 60 or even as much as 100 per cent of the total weight of yolks and whites separated. The latter would, of course, represent whole mixed eggs. Sodium chloride and sugar would then be added as previously described, and the resulting preparation frozen. I have found that no matter what total solids is desired in the finished product, uniformity may be obtained by adhering strictly to the proper percentage in the mixture made.

It will be obvious to those skilled in the art that various changes may be made in my improved product without departing from the spirit of my invention and therefore I do not limit myself to what is described in the specification but only as indicated in the appended claims.

I claim:

1. As a new article of manufacture, an egg product comprising the separated yolks of a given quantity of eggs plus sufficient whites to yield a mix representing substantially forty-eight per cent of the total weight of the yolks and whites so separated, and added sodium chloride and sugar in amounts sufficient to yield a mixture containing approximately one and one-half per cent added sodium chloride and ten per cent sugar.

2. As a new article of manufacture, an egg product comprising the separated yolks of a given quantity of eggs plus sufficient whites to yield a mix representing substantially forty-eight per cent of the total weight of the yolks and whites so separated, and added sodium chloride and sugar in amounts sufficient to yield a mixture containing approximately one and one-half per cent added sodium chloride and ten per cent sugar, the mixture being frozen at a temperature approximating 0° F.

3. A method of manufacturing an egg product which consists in separating the yolks from the whites of a given quantity of eggs, adding sufficient whites to the separated yolks to yield a mixture representing approximately forty-eight per cent of the combined weight of the yolks and whites so separated, and then adding to the mixture sodium chloride and sugar in amounts sufficient to yield a mixture containing one and one-half per cent added sodium chloride and ten per cent sugar.

4. A method of manufacturing a frozen egg product which consists in first separating the yolks from the whites of a given quantity of eggs, adding sufficient white material to yield a mix representing forty-eight per cent of the combined weight of the yolks and whites so separated, adding to the mixture sodium chloride and sugar in amounts sufficient to yield a mixture containing one and one-half per cent sodium chloride and ten per cent sugar, and then subjecting the preparation to a temperature approximating 0° F.

5. As a new article of manufacture, an egg product consisting of separated yolk material plus sufficient white material to yield a mix representing from approximately 48 to 60 per cent of the total weight of the separated yolks and whites plus approximately one and one-half per cent added sodium chloride and ten per cent sugar.

RAYMOND D. GERWE.